United States Patent [19]

Howard et al.

[11] Patent Number: 4,776,078

[45] Date of Patent: Oct. 11, 1988

[54] SLEEVE MOUNTING AND REMOVAL TOOL

[76] Inventors: Robert S. Howard, 226 Hampton St., Auburn, Mass. 01501; Camille S. Nasrah, 1 Clarendon St., Worcester, Mass. 01604

[21] Appl. No.: 70,295

[22] Filed: Jul. 6, 1987

[51] Int. Cl.[4] .............................................. B23P 19/04
[52] U.S. Cl. ..................................................... 29/252
[58] Field of Search ........................ 29/252, 234, 253; 285/382, 382.1–382.7, 39; 254/29 A, 29 R

[56] References Cited

U.S. PATENT DOCUMENTS

| | | | |
|---|---|---|---|
| 3,977,065 | 8/1976 | Johnson | 29/252 |
| 4,610,066 | 9/1986 | Cline | 29/252 |
| 4,646,411 | 3/1987 | Hankins | 29/252 |

Primary Examiner—Robert C. Watson

[57] ABSTRACT

A tool for use in combination with an annular roll fixed on the end of a shaft by means of a sleeve axially inserted in wedged engagement therebetween. The tool includes a hydraulically actuated piston-cylinder assembly having an axially extending mounting stem which is adapted to be received in detachably interlocked engagement within an axial blind bore in the end of the shaft. The cylinder is rotatable on the stem to adjust the tool between sleeve removal and sleeve inserting positions. When in the sleeve removal position, the piston bears against the shaft end and the cylinder engages and removes the sleeve. When in the sleeve insertion position, the cylinder is checked against a stop on the mounting stem and the piston urges the sleeve into wedged engagement between the roll and the shaft.

5 Claims, 3 Drawing Sheets

SLEEVE MOUNTING AND REMOVAL TOOL

BACKGROUND OF THE INVENTION

1. Field of the Invention

This invention relates generally to the art of changing work rolls in a rolling mill, and is concerned in particular with an improved tool for changing so-called "overhung" work rolls in rod and bar mills.

2. Description of the Prior Art

As part of the ongoing effort to increase the production efficiency of rolling mills, more attention is being focused on minimizing the down time occasioned by the need to change work rolls. To this end, mechanical manipulators and robots are being developed to assist operating personnel in performing this task as rapidly as possible. However, efforts to effectively utilize manipulators and robots have been frustrated by the handling complexities associated with conventional roll changing tools.

More particularly, overhung work rolls are conventionally fixed to the tapered ends of roll support shafts by means of tapered sleeves interposed in wedged engagement therebetween. A variety of hydraulically actuated tools have been developed to provide the considerable axial force required to seat and unseat the tapered sleeves. In some cases, two tools are required, one to seat the sleeves during roll mounting, and the other to unseat the sleeves during roll removal. In other cases, one tool accomplishes both functions by having its opposite ends adapted respectively to seat and unseat the sleeves.

In cases where two tools are required, the manipulators or robots must either be provided with two sets of arms, thereby increasing costs and operating complexities, or the tools must be manually interchanged, with considerable attendant lost time. In cases where one tool has its opposite ends adapted to handle both sleeve insertion and sleeve removal, the tool must be turned end to end during each roll changing operation. This again unduly increases operating complexities.

A primary objective of the present invention is to provide a novel and improved hydraulic tool which can accomplish both the sleeve insertion and sleeve removal functions without the need to turn the tool end to end.

A companion objective of the present invention is to provide a hydraulic tool which is simple to operate and consequently easily adaptable for use with mechanical manipulators, robots, or the like.

SUMMARY OF THE PRESENT INVENTION

The tool of the present invention includes a hydraulically actuated piston-cylinder assembly having an axially extending mounting stem which is adapted to be received in detachably interlocked engagement within an axial blind bore in the end of the roll shaft. The cylinder is rotatable on the stem to adjust the tool between sleeve removal and sleeve inserting positions. When in the sleeve removal position, the piston bears against the shaft end and the cylinder engages and removes the sleeve. When in the sleeve insertion position, the cylinder is checked against a stop on the mounting stem and the piston urges the sleeve into wedged engagement between the roll and the shaft.

DETAILED DESCRIPTION OF THE INVENTION

Figure 1:
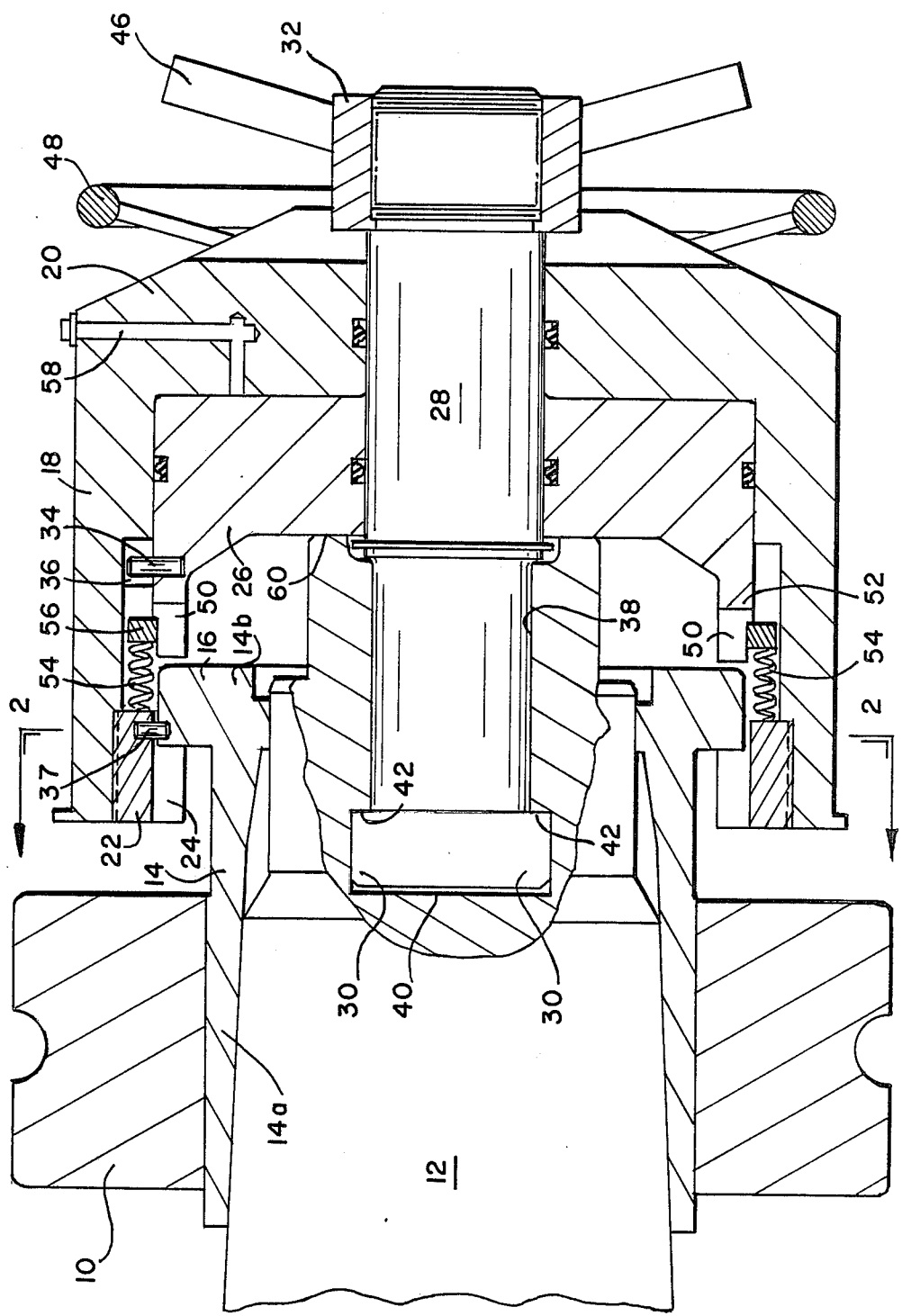
FIG. 1 is a sectional view through a tool in accordance with the present invention, showing the tool adjusted for sleeve removal.
Figure 2:
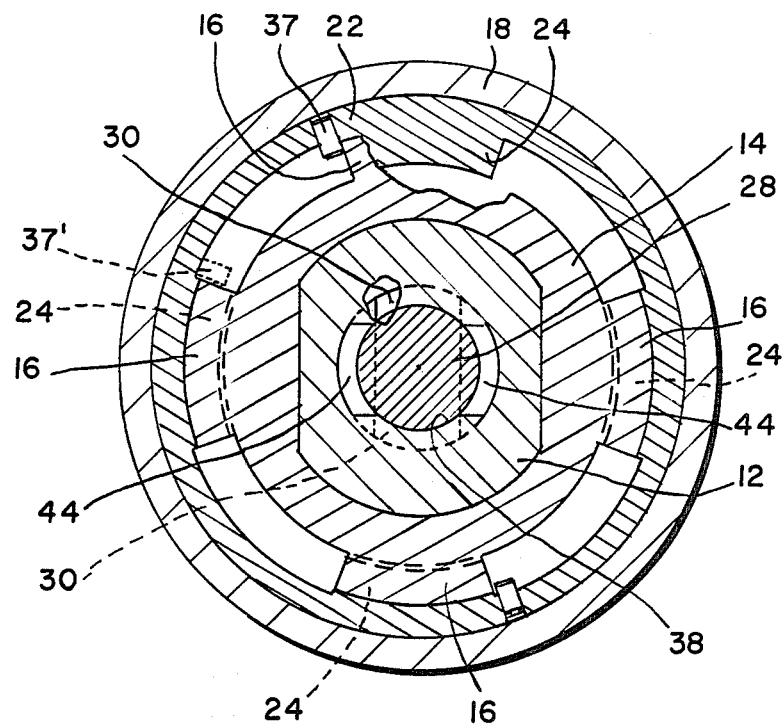
FIG. 2 is a sectional view, with portions broken away, taken on line 2—2 of FIG. 1.

Referring initially to FIGS. 1 and 2, an annular roll 10 is shown mounted in a conventional manner on the end of a roll shaft 12 by means of a tapered sleeve 14 having one end 14a axially inserted in wedged engagement therebetween. The opposite end 14b of the sleeve is spaced axially from the outboard face of the roll 10 and is provided with a series of circumferentially spaced first lugs 16 extending radially outwardly therefrom.

The tool of the present invention includes a cylinder 18 closed at one end by an end wall 20 and open at the opposite end. A ring 22 is threaded into the open end of the cylinder and is provided with a series of circumferentially spaced second lugs 24 extending radially inwardly therefrom.

A piston 26 is contained within the cylinder 18. A mounting stem 28 extends axially through both the piston 26 and the cylinder 18. One end of the mounting stem protrudes from the open cylinder end and is provided with oppositely extending lateral bosses 30. The opposite end of the mounting stem protrudes through the cylinder end wall 20 and is provided with an enlarged collar 32 forming a stop. The piston and cylinder are shiftable in opposite directions in relation to each other as well as in relation to the mounting stem, with the axial shifting of the cylinder in the outboard direction (to the right as viewed in FIG. 1) being limited by engagement with the collar 32. The piston and cylinder are also rotatable in relation to the mounting stem. A pin 34 on the piston 26 extends radially into a slot 36 in the cylinder wall to prevent relative rotation between the piston and cylinder. Another pin 37 protrudes radially inwardly from the ring 22 threaded into the open end of the cylinder 18.

The roll shaft 12 has a blind bore defined by an axial passageway leading to an enlarged diameter chamber 40, with the juncture between the chamber and passageway defining locking surfaces or shoulders 42. The passageway 38 is laterally enlarged by side slots 44 configured and dimensioned to accommodate the oppositely extending lateral bosses 30 on the mounting stem. By aligning the bosses 30 with the side slots 44, the mounting stem 28 can be inserted into the passageway to place the bosses 30 in the chamber 40. Then, by rotating the stem 90°, the bosses can be positioned behind the locking shoulders 42, thereby placing the mounting stem in axially interlocked engagement with the roll shaft 12. A reverse 90° rotation frees the stem for axial disengagement from the roll shaft. The mounting stem 28 and cylinder 18 are respectively provided with exterior handles 46, 48 to facilitate their rotative adjustment.

In the condition shown in FIGS. 1 and 2, the tool has been axially received on the end of the roll shaft 12. The stem 28 has been rotatably adjusted to located its bosses 30 behind the locking shoulders 42, thereby achieving an axial interlock of the tool on the shaft end.

The cylinder 18 has been rotated with respect to the stem 28 to locate the second lugs 24 behind and in alignment with the first lugs 16 on the outboard end 14b of sleeve 14. Because of the mechanical interlock between the piston and sleeve provided by the pin 34 received in slot 36, a corresponding rotation has been imparted to the piston to thereby align slots 50 in its annular end flange with the first lugs 16.

Figure 3:
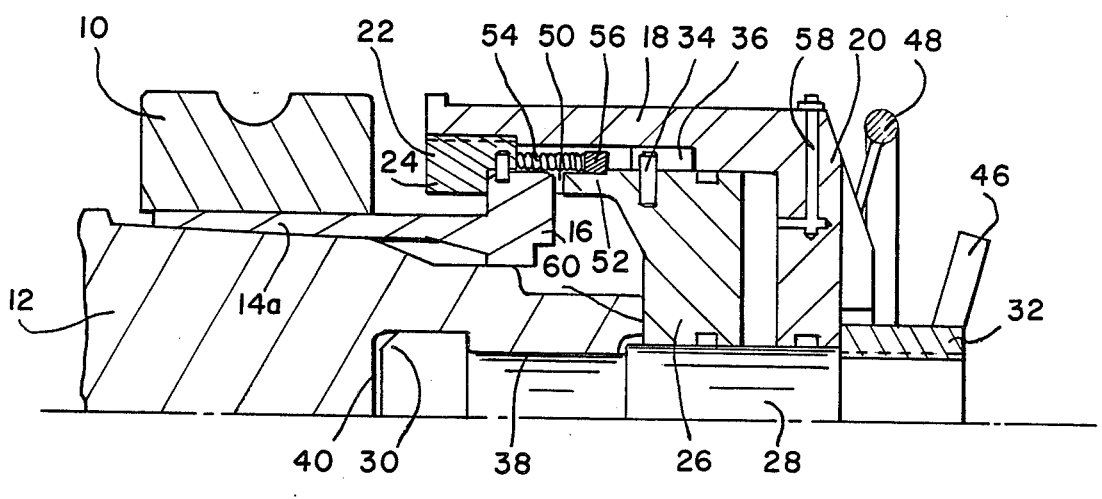
FIG. 3 is a partial sectional view similar to FIG. 1, showing the tool at the conclusion of the sleeve removal stroke.

Compression springs 54 are interposed between the ring 22 and a snap ring 56 on the piston end flange 52. The springs 54 resiliently urge the piston against the end wall 20 of the cylinder 18. A hydraulic fluid passageway 58 leads to the interface between the piston 26 and cylinder end wall 20. When hydraulic fluid is pumped into passageway 58, the piston 26 and cylinder end wall 20 are axially separated. The piston is checked against the end of the roll shaft 12 as at 60, thereby causing the cylinder 18 to be shifted axially in the outboard direction (to the right as viewed in FIG. 1) with respect to both the stem 28 and the piston 26. Thus as shown in FIG. 3, because of the mechanical interlock of the second lugs 24 behind the first lugs 16, the sleeve 14 is pulled axially out of its seated position in wedged engagement between the roll 10 and shaft 12. The slots 50 in the end flange 52 of the piston receive the first lugs 16 as the sleeve is drawn towards the piston. The axial movement of the sleeve relative to the piston compresses the springs 54. Consequently, when hydraulic fluid pressure is relieved, the springs 54 return the sleeve to the position shown in FIG. 1. Then, by rotating the cylinder 18 to align the second lugs 24 with the spaces between the first lugs 16, and by rotating the stem 28 to align the bosses 30 with the side slots 44 in passageway 38, the tool can be removed from the roll shaft, after which the sleeve and roll can be dismantled.

Figure 4:
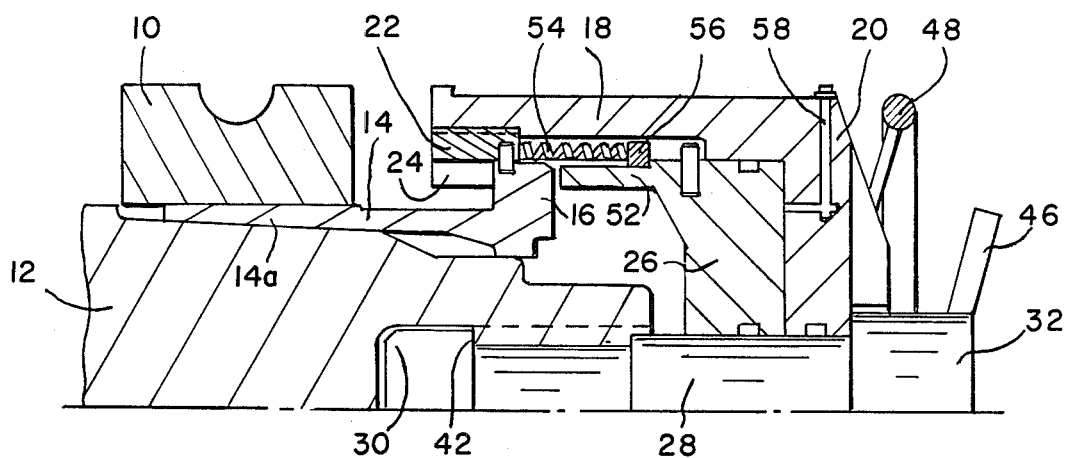
FIG. 4 is another partial sectional view showing the tool adjusted for sleeve insertion.
Figure 5:
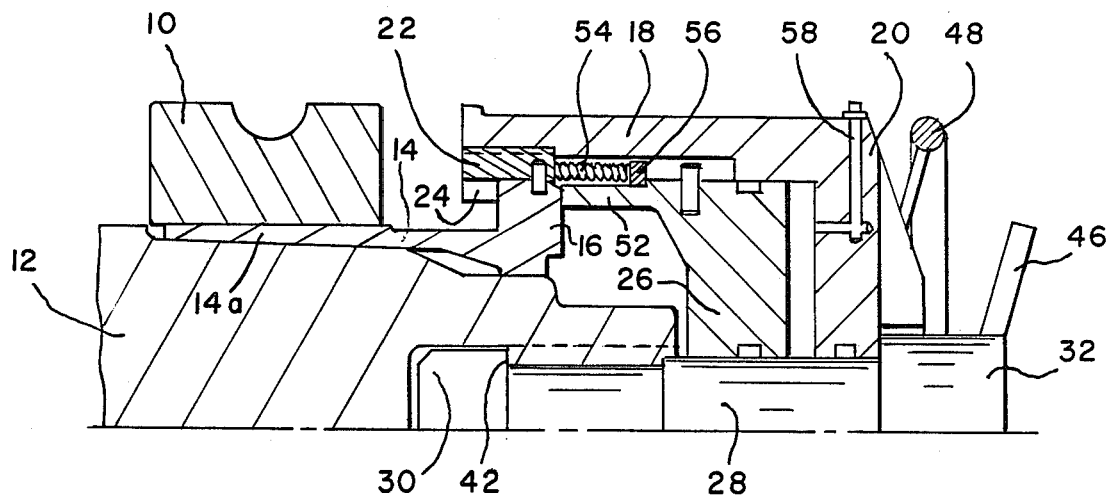
FIG. 5 is a view similar to FIG. 4 showing the tool at the conclusion of the sleeve insertion stroke.

FIGS. 4 and 5 illustrates the operating sequence during roll mounting, which entails forcibly seating the sleeve 14 between the roll and the roll shaft. As shown in FIG. 4, the tool is again mounted on the end of the roll shaft 12, with the mounting stem 28 received in passageway 38, and with the lateral bosses 30 interlocked behind the locking shoulders 42. The cylinder 18 is rotatably adjusted to align the spaces between the second lugs 24 with the first lugs 16 on the sleeve. Hydraulic fluid is again pumped into passageway 58 to axially separate the piston 26 from the cylinder end wall 20. The cylinder end wall is checked against the stem shoulder 32, and the piston is moved axially in the inboard direction (to the left as viewed in FIGS. 4 and 5). The end flange 52 on the piston engages the first lugs 16 on the sleeve, causing the sleeve to be forcibly wedged between the roll 10 and shaft 12, as shown in FIG. 5. The spaces between the second lugs 24 accommodate movement of the sleeve relative to the cylinder, and movement of the piston 26 relative to the cylinder 18 again compresses the springs 54. Thus, when hydraulic pressure is relieved, the springs 54 return the piston to the position shown in FIG. 4. Then, by simply rotating the stem 28 to disengage the bosses 30 from the locking shoulders 42, the tool can be removed from the roll shaft.

When in the position shown by the solid lines in FIG. 2, the pin 37 abuts a side of one of the first lugs 16 and thus locates the second lugs 24 behind the first lugs for sleeve removal. When the cylinder is rotated in a counterclockwise direction to cause pin 37 to abut the side of the next adjacent first lug 16 (as shown by the broken lines at 37' in FIG. 2), the spaces between the second lugs 24 are aligned with the first lugs 16 for sleeve insertion.

In light of the foregoing, it will now be appreciated by those skilled in the art that the tool of the present invention offers a number of significant advantages. For example, the tool may be rapidly engaged with the shaft end by simply inserting the mounting stem 28 into the passageway 38 and then turning it through a quarter turn to engage the bosses 30 behind the locking shoulders 42. Disengagement merely requires reversing this simple procedure.

The tool is rapidly and easily adjusted for either sleeve removal or sleeve insertion by simply rotating the cylinder between the two positions established by the locating pin 37. Both removal and insertion are effected by connecting the same end of the tool to the roll shaft.

We claim:

1. For use in combination with an annular roll fixed on the end of a shaft by means of a sleeve having one end axially inserted in wedged engagement between the roll and the shaft and having an opposite end spaced axially from the roll with circumferentially spaced first lugs extending radially outwardly therefrom, a tool for axially shifting said sleeve into and out of wedged engagement between the roll and the shaft, said tool comprising:

a cylinder closed at one end and open at the opposite end, with circumferentially spaced specond lugs extending radially inwardly from said cylinder at said opposite end;

a piston contained within said cylinder;

a stem extending axially through said piston and said cylinder, said piston and said cylinder being axially shiftable in opposite directions in relation to each other as well as in relation to said stem, with the axial shifting of said cylinder in one direction relative to said stem being limited by a stop on said stem, and said cylinder and said stem being relatively rotatable;

connecting means for detachably connecting said stem to said shaft, with said stem and said shaft being in axial alignment, and with said first lugs being arranged in a plane vertically located between said second lugs and said piston;

means for rotating said cylinder in relation to the thus connected stem between a sleeve removal position at which said second lugs are aligned in an interlocked relationship with said first lugs, and a sleeve inserting position at which said second lugs are aligned with the spaces between said first lugs; and means for introducing a pressurized fluid medium between said piston and the closed end of said cylinder, whereupon when said cylinder is in the sleeve removal position, said piston will be urged in one direction against the shaft end and said cylinder will be urged in the opposite direction to disengage the sleeve from between the roll and shaft, and whereupon when said cylinder is in the sleeve mounting position, said cylinder will be urged in one direction against said stop and said piston will be urged in the opposite direction against said first lugs to axially force said sleeve into wedged engagement between said roll and said shaft.

2. The tool as claimed in claim 1 further comprising means for resiliently biasing said piston towards the closed end of said cylinder.

3. The tool as claimed in claim 1 wherein said connecting means comprisesa blind bore in said shaft adapted to axially receive an end of said stem, said bore having locking surfaces adapted to be rotatably engaged by laterally extending bosses on the said end of said stem.

4. The tool as claimed in claim 3 further comprising external handle means at the closed end of said cylinder for rotatably manipulating said cylinder and said stem.

5. The tool as claimed in claim 1 comprising locating means for limiting the rotation of said cylinder between said sleeve removal position and said sleeve inserting position.

* * * * *